United States Patent
Kato et al.

(10) Patent No.: US 10,898,956 B2
(45) Date of Patent: Jan. 26, 2021

(54) MANUFACTURING METHOD OF COPPER BONDED PART

(71) Applicant: MITSUBISHI MATERIALS CORPORATION, Tokyo (JP)

(72) Inventors: Jun Kato, Kitamoto (JP); Koichi Kita, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 289 days.

(21) Appl. No.: 15/768,920

(22) PCT Filed: Oct. 12, 2016

(86) PCT No.: PCT/JP2016/080201
§ 371 (c)(1),
(2) Date: Apr. 17, 2018

(87) PCT Pub. No.: WO2017/130471
PCT Pub. Date: Aug. 3, 2017

(65) Prior Publication Data
US 2019/0054538 A1   Feb. 21, 2019

(30) Foreign Application Priority Data

Jan. 27, 2016   (JP) .................... 2016-013683

(51) Int. Cl.
*B22F 7/06* (2006.01)
*C22C 1/08* (2006.01)
(Continued)

(52) U.S. Cl.
CPC .............. *B22F 7/064* (2013.01); *B22F 7/002* (2013.01); *B22F 7/08* (2013.01); *B23K 35/0244* (2013.01);
(Continued)

(58) Field of Classification Search
CPC ........ B22F 7/002–004; B22F 7/06–064; B22F 7/02–08; B32B 2311/12; B23B 15/00–043
(Continued)

(56) References Cited

U.S. PATENT DOCUMENTS 3,421,577 A * 1/1969 Valyi .................... F28F 3/14
165/170
3,716,347 A * 2/1973 Bergstrom ........... B23K 35/001
428/550
(Continued)

FOREIGN PATENT DOCUMENTS

CN   1234311 A   11/1999
CN   101327551 A   12/2008
(Continued)

OTHER PUBLICATIONS

Tang Y., et al. "An Innovative Fabrication Process of Porous Metal Fiber Sintered Felts with Three-Dimensional Reticulated Structure", Materials and Manufacturing Processes, 2010 (Year: 2010).*
(Continued)

*Primary Examiner* — Alexandra M Moore
*Assistant Examiner* — Austin Pollock
(74) *Attorney, Agent, or Firm* — Locke Lord LLP

(57) ABSTRACT

A manufacturing method of a copper bonded part in which a first copper member and a second copper member are bonded together. The first copper member and the second copper member are made of copper or a copper alloy, and at least one of the first copper member and the second copper member includes a copper porous body made of copper or a copper alloy. This manufacturing method has a bonding material disposing step S01 of disposing a bonding material between the first copper member and the second copper member, and a reduction sintering step S02 of heating and
(Continued)

holding the first copper member, the second copper member, and the bonding material in a reducing atmosphere in a range of 600° C. or higher and 1,050° C. or lower. The bonding material contains a copper oxide or a mixture of metallic copper and the copper oxide.

22 Claims, 2 Drawing Sheets

(51) Int. Cl.
  *B22F 7/00*    (2006.01)
  *B23K 35/30*   (2006.01)
  *B23K 35/02*   (2006.01)
  *B23K 35/36*   (2006.01)
  *B22F 7/08*    (2006.01)
  *B22F 9/22*    (2006.01)

(52) U.S. Cl.
  CPC ........ *B23K 35/302* (2013.01); *B23K 35/3602* (2013.01); *C22C 1/08* (2013.01); *B22F 9/22* (2013.01); *B22F 2201/01* (2013.01); *B22F 2301/10* (2013.01); *B22F 2302/25* (2013.01); *B22F 2998/10* (2013.01)

(58) Field of Classification Search
  USPC .......................................................... 148/24
  See application file for complete search history.

(56) References Cited

U.S. PATENT DOCUMENTS

| | | | |
|---|---|---|---|
| 6,323,458 | B1 | 11/2001 | Nomura et al. |
| 2005/0233666 | A1* | 10/2005 | Losfeld .............. B01D 39/2044 |
| | | | 442/376 |
| 2009/0165651 | A1* | 7/2009 | Burgess .................. B22F 7/002 |
| | | | 95/284 |
| 2010/0047612 | A1 | 2/2010 | Kugo et al. |
| 2016/0338201 | A1* | 11/2016 | Kiyono .................. B22F 1/0059 |
| 2017/0278589 | A1* | 9/2017 | Yasuda ...................... C01G 3/02 |
| 2018/0161877 | A1* | 6/2018 | Kita ........................ B22F 7/002 |

FOREIGN PATENT DOCUMENTS

| | | |
|---|---|---|
| CN | 101491963 A | 7/2009 |
| CN | 102836642 A | 12/2012 |
| CN | 103958113 A | 7/2014 |
| CN | 105452195 A | 3/2016 |
| EP | 2930252 A1 | 10/2015 |
| JP | 2008-127584 A | 6/2008 |
| JP | 2010-065277 A | 3/2010 |
| JP | 2011-106023 A | 6/2011 |
| JP | 2012-099384 A | 5/2012 |
| JP | 2013-091835 A | 5/2013 |
| JP | 2014-057024 A | 3/2014 |
| JP | 2015104748 A * | 6/2015 |
| JP | 2016-079495 A | 5/2016 |

OTHER PUBLICATIONS

Kobayashi Y., et al., "Metal-Metal Bonding Properties of Copper Oxide Nanoparticles", J. of Surface Science and Nanotechnology, (2004), 12, p. 105-108 (Year: 2014).*

Kobayashi Y. "Metal-metal bonding processes using cuprous oxide nanoparticles", J. of Materials Research and Technology (2016), 345-352 (Year: 2016).*

International Search Report dated Jan. 17, 2017, issued for PCT/JP2016/080201 and English translation thereof.

Office Action dated Jun. 14, 2019, issued for the Chinese patent application No. 201680059650.0 and an English translation of the search report.

* cited by examiner

MANUFACTURING METHOD OF COPPER BONDED PART

TECHNICAL FIELD

The present invention relates to a manufacturing method of a copper bonded part in which copper members made of copper or a copper alloy are bonded together.

Priority is claimed on Japanese Patent Application No. 2016-013683, filed on Jan. 27, 2016, the content of which is incorporated herein by reference.

BACKGROUND ART

In the related art, in the case of bonding together copper members made of copper or a copper alloy, for example, a bonding method in which a low-melting-point bonding material such as a brazing material or a solder material having a lower melting point than the copper members is used is being widely applied. Examples of the low-melting-point bonding material such as a brazing material or a solder material include low-melting-point metal such as Sn and copper alloys including an element for lowering a melting point of copper such as P. In the case of bonding using the above-described low-melting-point bonding material made of a low-melting-point metal or a copper alloy including an element for lowering a melting point, there is a problem in that a bonding layer formed between the copper members has a lower electrical conductivity or thermal conductivity than the copper members. In addition, since the melting point of the bonding layer is low, there is a problem in that the above-described bonding method cannot be used in high-temperature environments.

In addition, for example, in a case in which any one of the copper members is a copper porous body, there is a problem in that a liquid phase generated during bonding enters pore portions in the copper porous body, the porosity of the copper porous body changes, and bonding becomes insufficient.

As a bonding method in which a low-melting-point bonding material such as a brazing material or a solder material is not used, a method in which copper materials are bonded together by sintering the powder of copper oxide or metallic copper has been proposed.

For example, Patent Document 1 discloses a sintered bonded material for which copper (II) oxide nanoparticles are used. In addition, Patent Document 2 discloses a sintered bonded material for which copper nanoparticles are used. These sintered bonded materials described in Patent Document 1 and Patent Document 2 improve the bonding property by using highly sinterable nanoparticles.

CITATION LIST

Patent Literature

[Patent Document 1] Japanese Unexamined Patent Application, First Publication No. 2012-099384
[Patent Document 2] Japanese Unexamined Patent Application, First Publication No. 2013-091835

SUMMARY OF INVENTION

Technical Problem

Meanwhile, in the bonded material for which nanoparticles are used, there is a tendency that the nanoparticles easily agglomerate, and thus it is necessary to disperse the nanoparticles in a solution and further add a dispersion stabilizer thereto.

However, there is a concern that the dispersion stabilizer and the like may remain in the bonding layer depending on the bonding conditions and the like, and the bonding strength may decrease. In addition, in a case in which the dispersion stabilizer is not added thereto, there is a concern that the nanoparticles may agglomerate, which disables uniform bonding, and the bonding strength may decrease.

In addition, for example, in a case in which any one of the copper members is a copper porous body, the solution in which the nanoparticles are dispersed enters pore portions in the copper porous body, and it is difficult to favorably bond the copper porous body.

The present invention has been made in consideration of the above-described circumstances, and an object of the present invention is to provide a manufacturing method of a copper bonded part having a high bonding strength and having a bonding layer being excellent in terms of electrical conductivity, thermal conductivity, and thermal resistance.

Solution to Problem

[1] A manufacturing method of a copper bonded part of the present invention is a manufacturing method of a copper bonded part in which a first copper member and a second copper member are bonded together. The first copper member and the second copper member are made of copper or a copper alloy, at least one of the first copper member and the second copper member includes a copper porous body made of copper or a copper alloy. The manufacturing method includes a bonding material disposing step of disposing a bonding material between the first copper member and the second copper member, and a reduction sintering step of heating and holding the first copper member, the second copper member, and the bonding material in a reducing atmosphere in a range of 600° C. or higher and 1,050° C. or lower. The bonding material contains a copper oxide or a mixture of metallic copper and copper oxide, and a molar ratio between copper and oxygen in the bonding material is set to be in a range (Cu:O) of 1:0.3 to 1.0. An average particle diameter D of the copper oxide powder or the metallic copper powder is in a range of $0.05 \times Dp \leq D \leq 2 \times Dp$ with respect to an average pore diameter Dp of the copper porous body, and a bonding layer made of metallic copper is formed between the first copper member and the second copper member.

According to this manufacturing method of a copper bonded part, since the manufacturing method has the bonding material disposing step of disposing the bonding material having the copper oxide or the mixture of metallic copper and the copper oxide, in which the molar ratio between copper and oxygen is set to be in a range (Cu:O) of 1:0.3 to 1.0, between the first copper member and the second copper member and the reduction sintering step of heating and holding the first copper member, the second copper member, and the bonding material in a reducing atmosphere in a range of 600° C. or higher and 1,050° C. or lower, sintering is accelerated due to the hole diffusion of copper (I) oxide included in the copper oxide under a predetermined atmosphere and temperature condition, and additionally, the copper oxide is reduced, nascent surfaces of metallic copper are generated, and sintering is accelerated due to surface diffusion caused by the contact between the nascent surfaces.

As described above, sintering is accelerated due to the hole diffusion and the surface diffusion, and thus it becomes possible to improve the bonding strength. In addition, the copper oxide is reduced between the first copper member and the second copper member, and thus a bonding layer which has a high purity, is excellent in terms of electrical conductivity and thermal conductivity, and is made of metallic copper having a high melting point is formed, and it becomes possible to form a bonding layer that is excellent in terms of thermal resistance, electrical conductivity, and thermal conductivity.

In addition, although at least one of the copper members is a copper porous body, no liquid phase is generated during bonding, and no liquid is used, and thus there is no concern that a liquid phase or liquid enters pore portions in the copper porous body. Therefore, the copper porous body can be favorably bonded.

Since the bonding material has the copper oxide powder or the metallic copper powder, and the average particle diameter D of the copper oxide powder or the metallic copper powder is set to be in a range of $0.05 \times Dp \leq D \leq 2 \times Dp$ with respect to the average pore diameter Dp of the copper porous body, even in a case in which the copper oxide powder or the metallic copper powder is disposed on the surface of the porous body, it is possible to suppress the copper oxide powder or the metallic copper powder entering the inside of the copper porous body, and it is possible to sufficiently ensure the contact areas between the bonding material and members to be bonded, and thus the copper porous body can be reliably bonded.

[2] In the manufacturing method [1], the bonding material may include copper (I) oxide. In this case, since the bonding material disposed between the copper members includes copper (I) oxide, it is possible to reliably make the copper (I) oxide be present in a bonding interface in a first sintering step, and it is possible to sufficiently accelerate sintering by means of the hole diffusion of the copper (I) oxide. Therefore, it is possible to improve the bonding strength.

[3] In the manufacturing method [1] or [2], the copper porous body may have a specific surface area of 0.01 m²/g or more and a porosity of 50% or more and 95% or less.

[4] In any of the manufacturing methods [1] to [3], the copper porous body may have a skeleton in which a plurality of copper fibers is entangled and sintered together, the copper fiber may have a diameter R in terms of an equivalent circle diameter of 0.02 mm or more and 1.0 mm or less, and a ratio L/R of a length L to the diameter R of the copper fiber may be in a range of 4 or more and 2,500 or less.

[5] In any of the manufacturing methods [1] to [4], the copper porous body may have an apparent density $D_A$ that is 51% or less of a true density $D_T$ of the copper fiber.

[6] In any of the manufacturing methods [1] to [5], in the bonding material disposing step, an amount of the copper oxide powder or a powder mixture of the metallic copper powder and the copper oxide powder disposed per unit area in a bonding surface between the first copper member and the second copper member may be set to 0.02 g/cm² or more and 0.5 g/cm² or less.

Advantageous Effects of Invention

According to the present invention, it is possible to provide a manufacturing method of a copper bonded part having a high bonding strength and having a bonding layer being excellent in terms of electrical conductivity, thermal conductivity, and thermal resistance.

DESCRIPTION OF EMBODIMENTS

Hereinafter, a manufacturing method of a copper bonded part which is an embodiment of the present invention will be described with reference to the accompanying drawings.

Figure 1:
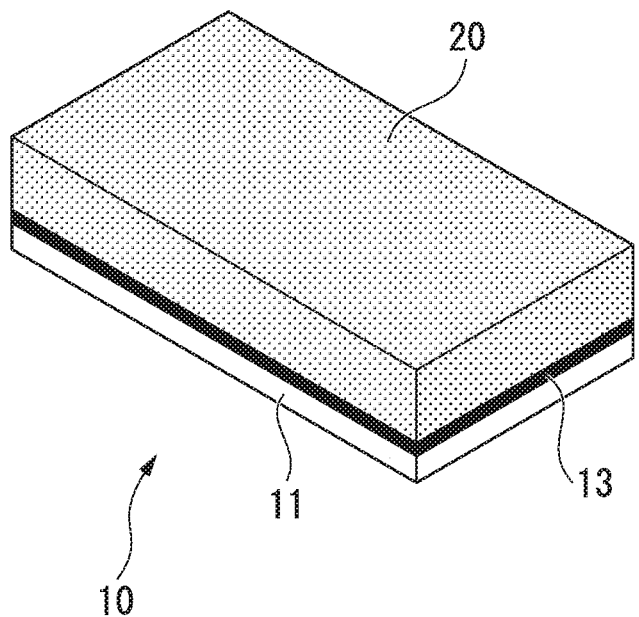
FIG. 1 is an appearance explanatory view of a copper bonded part (copper porous composite member) which is an embodiment of the present invention.

The copper bonded part which is the present embodiment is a copper porous composite member 10 in which a copper plate 11 and a copper porous body 20 are bonded together as shown in FIG. 1. That is, one copper member (first copper member) is the copper plate 11, the other copper member (second copper member) is the copper porous body 20, and these members are bonded to each other. The copper plate 11 shown in FIG. 1 has a rectangular plate shape, and the copper porous body 20 has a cuboid shape which is the same planar shape as the copper plate 11, but is thicker than the copper plate. However, the present invention is not limited to this shape or thickness and may have any shape or thickness depending on the application. In addition, it is also possible to use a copper member in which only a part is formed of a copper porous body and the remaining portion is a copper solid material, and it is also possible to bond together two copper porous bodies.

Figure 2:
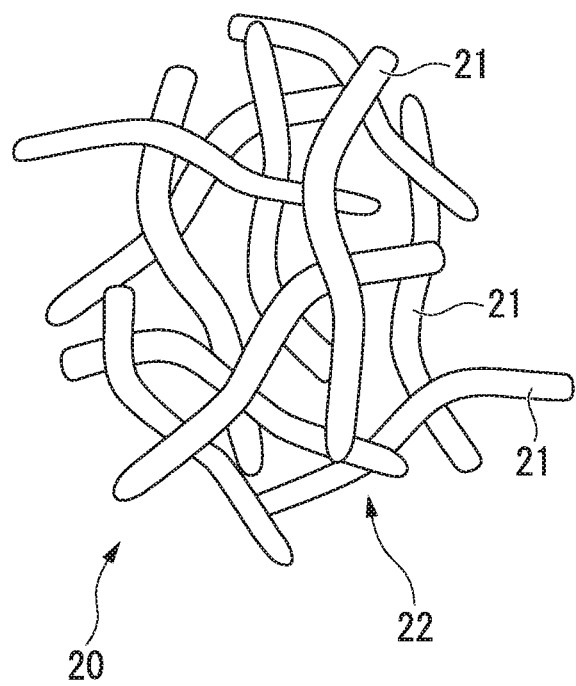
FIG. 2 is an enlarged schematic view of a copper porous body in the copper bonded part (copper porous composite member) shown in FIG. 1.

The copper porous body 20 has a skeleton 22 in which a plurality of copper fibers 21 is entangled and sintered together as shown in FIG. 2. In the present embodiment, the entire copper porous body 20 has a specific surface area set to 0.01 m²/g or more and a porosity set to be in a range of 50% or more and 95% or less, however, the present invention is not limited to this range.

As the specific surface area of the copper porous body, a value computed using a BET expression from a gas adsorption amount measured using a gas adsorption amount measurement instrument (trade name: QUANTACHROME AUTOSORB-1) and Kr gas as a measurement gas.

The copper fiber 21 is made of copper or a copper alloy, and, in this example, the cross section has a circular shape, the diameter R is set to be in a range of 0.02 mm or more and 1.0 mm or less, and the ratio L/R of the length L to the diameter R is set to be in a range of 4 or more and 2,500 or less. However, the cross-sectional shape, size, or aspect ratio of the copper fiber 21 is not limited to the above-described range. The cross section of the copper fiber 21 may have an elliptical shape, a rectangular shape, a flat shape, or the like, and, in a case in which the cross section does not have a circular shape, the equivalent circle diameter obtained by converting the shape to a circular shape having the same cross-sectional area is used as the diameter R. In the present embodiment, the copper fiber 21 is constituted of, for example, C1100 (tough pitch copper). In the present embodiment, the copper fiber 21 is imparted with a shape by means of twisting, bending, or the like.

In the copper porous body 20 which is the present embodiment, the apparent density $D_A$ is set to 51% or less of the true density $D_T$ of the copper fiber 21. The shape of the copper fiber 21 is a random shape such as a linear shape or a curved shape as long as the apparent density $D_A$ is 51% or less of the true density $D_T$ of the copper fiber 21. When the copper fiber 21 at least a part of which is imparted with a predetermined shape by means of a twisting process, a bending process, or the like is used, it is possible to stereoscopically and isotropically form a void shape between the fibers, and consequently, a variety of characteristics such as the heat-transfer characteristic and electrical conductivity of the copper porous body 20 improve isotropically.

The copper fiber 21 is adjusted to a predetermined equivalent circle diameter using a drawing method, a coil cutting method, a wire cutting method, a melt-spinning method, or the like, and furthermore, the copper fiber is cut to a length adjusted so as to satisfy a predetermined L/R, whereby the copper fiber is manufactured.

The equivalent circle diameter R is a value computed from the cross-sectional area A of each fiber as the basis and is defined by the following expression with an assumption that the cross section is truly circular regardless of the cross-sectional shape.

$$R=(A/\pi)^{1/2} \times 2$$

The copper plate 11 is made of copper or a copper alloy and is, for example, a rolled plate of C1100 (tough pitch copper) in the present embodiment. Here, the material of the copper plate 11 and/or the copper fiber 21 may be pure copper or other copper alloys.

Between the copper porous body 20 and the copper plate 11, a bonding layer 13 made of metallic copper which is formed by reducing and sintering a bonding material including a copper oxide is provided. The bonding layer 13 is formed so as to connect one surface of the copper plate 11 and the copper fibers 21 constituting one surface of the copper porous body 20. The bonding layer 13 may be a dense layer in which some of the copper fibers 21 are embedded, a porous layer that covers one surface of the copper plate 11 and some of the copper fibers 21 and spreads in a network shape, or a layer in which the above-described porous layer spreading in a network shape is formed on the above-described dense layer.

Figure 3:
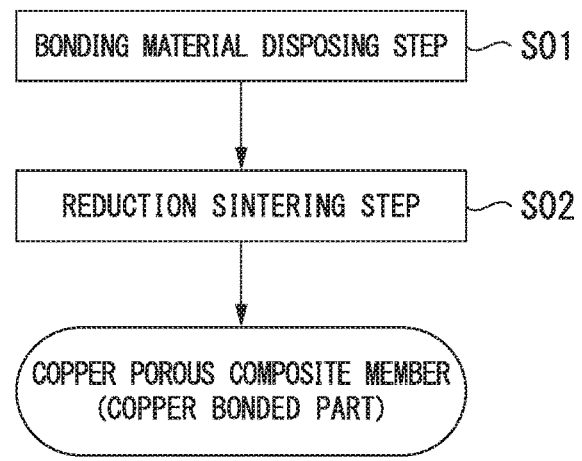
FIG. 3 is a flowchart showing an example of a manufacturing method of the copper bonded part (copper porous composite member) shown in FIG. 1.

Next, a manufacturing method of the copper porous composite member 10 (copper bonded part) which is the present embodiment will be described with reference to a flowchart in FIG. 3.

(Bonding Material Disposing Step S01)

First, a bonding material having a copper oxide or a mixture of metallic copper and a copper oxide is disposed in the bonding interface between the copper plate 11 and the copper porous body 20. The molar ratio between copper and oxygen in the copper oxide is set to be in a range (Cu:O) of 1:0.3 to 1.0. The molar ratio is more preferably 1:0.3 to 0.7 (Cu:O). The copper oxide includes copper (I) oxide ($Cu_2O$).

During the disposition of the bonding material in the bonding interface, in the bonding surface of the copper plate 11 and/or the bonding surface of the copper porous body 20, (1) copper oxide powder and metallic copper powder may be scattered, (2) paste containing copper oxide powder or a mixture of metallic copper powder and copper oxide powder may be applied, or (3) a sheet containing copper oxide or a mixture of metallic copper and copper oxide may be placed.

(1) In a case in which copper oxide powder and metallic copper powder are scattered, the copper oxide powder and the metallic copper powder may be fixed to the bonding surface by applying an acrylic resin, a cellulose derivative represented by methyl cellulose, a phenolic resin, and a binder such as polyvinyl alcohol, polyethylene glycol, or glycerin or a mixture of a solvent such as acetone, isopropyl alcohol, or an acetic acid ester and the above-described binder to the bonding surface and scattering the copper oxide powder and the metallic copper powder on this coated film. The binder or the solvent is decomposed or volatilized during bonding and thus removed.

(2) In a case in which paste containing copper oxide powder and metallic copper powder is applied, sol-form paste obtained by mixing the copper oxide powder and the metallic copper powder into the binder and/or the solvent may be used. The viscosity of the paste is desirably adjusted to be a certain value or the like in order to prevent the paste from being absorbed into the inside of the copper porous body 20. Specifically, the viscosity of the paste at 20° C. is preferably 0.01 to 200 Pa·s and more preferably 0.1 to 100 Pa·s, however is not limited to this range.

(3) In a case in which a sheet containing copper oxide or a mixture of metallic copper and copper oxide is placed, a gel-form or solid-form sheet obtained by mixing the metal oxide powder and the metallic copper powder into the binder and/or the solvent may be used.

In any case of (1) to (3), the amount of the copper oxide powder or a powder mixture of the metallic copper powder and the copper oxide powder disposed per unit area in the bonding surface is preferably 0.02 $g/cm^2$ or more and 0.5 $g/cm^2$ or less and more preferably 0.05 $g/cm^2$ or more and 0.4 $g/cm^2$ or less.

In the present embodiment, the bonding material includes the copper oxide powder or the powder mixture of the metallic copper powder and the copper oxide powder, a binder such as acryl may be applied to the bonding surface, and the copper oxide powder or the powder mixture of metallic copper powder and copper oxide powder may be scattered. The amount of the copper oxide powder or the powder mixture of the metallic copper powder and the copper oxide powder disposed per unit area at this time may be set to be in a range of 0.02 $g/cm^2$ or more and 0.5 $g/cm^2$ or less.

The average particle diameter D of the copper oxide powder or the metallic copper powder is set to be in a range of $0.05 \times Dp \leq D \leq 2 \times Dp$ with respect to the average pore diameter Dp of the copper porous body 20 and, in the present embodiment, is set to be in a range of 1.5 μm or more and 400 μm or less. The average pore diameter Dp of the copper porous body 20 can be measured using a mercury penetration described below. The average particle diameter D may be in a range of $0.03 \times Dp \leq D \leq 3 \times Dp$ and in a range of 0.5 μm or more and 600 μm or less.

(Reduction Sintering Step S02)

Next, in a state in which an assembled body is formed by disposing the bonding material having the copper oxide or the mixture of the metallic copper and the copper oxide in the bonding interface between the copper plate 11 and the copper porous body 20, the assembled body is heated and held in a reducing atmosphere in a range of 600° C. or higher and 1,050° C. or lower.

In the reduction sintering step S02, since the assembled body is held under the predetermined atmosphere and temperature condition, sintering is accelerated due to the hole diffusion of copper (I) oxide ($Cu_2O$) included in the copper oxide, and additionally, the copper oxide is reduced, nascent surfaces made of metallic copper which do not have any surface oxidation coats are generated, and sintering is accelerated due to surface diffusion caused by the contact between the nascent surfaces.

In a case in which the molar ratio of oxygen to copper in the bonding material is less than 0.3, the content of the copper oxide is not sufficient, and there is a concern that, in the reduction sintering step S02, nascent surfaces may not be sufficiently generated and the acceleration of sintering due to surface diffusion may not be sufficient. Therefore, in the present embodiment, the molar ratio of oxygen to copper in the bonding material is set to 0.3 or more.

In addition, in a case in which the heating temperature in the reduction sintering step S02 is lower than 600° C., there is a concern that surface diffusion and volume diffusion between the nascent surfaces after reduction may not proceed and sintering may not be accelerated. On the other hand, in a case in which the heating temperature in the reduction sintering step S02 exceeds 1,050° C., there is a concern that the temperature may locally exceed 1,065° C. which is the eutectic temperature of $Cu_{0.96}O_{0.04}$ and the copper plate 11 and the copper porous body 20 may be melted. Based on what has been described above, in the present embodiment, the heating temperature in the reduction sintering step S02 is set to be in a range of 600° C. or higher and 1,050° C. or lower.

The holding time in the above-described heating temperature range in the reduction sintering step S02 is preferably set to be in a range of five minutes or longer and 300 minutes or shorter.

When the holding time in the reduction sintering step S02 is shorter than five minutes, there is a concern that sintering may not sufficiently proceed. On the other hand, when the holding time in the reduction sintering step S02 exceeds 300 minutes, there is a concern that sintering may proceed more than necessary and the porosity of the copper porous body 20 may decrease. Based on what has been described above, the holding time in the above-described heating temperature range in the reduction sintering step S02 is set in the above-described range.

In the reduction sintering step S02, $H_2$ gas, a $N_2$—$H_2$ gas mixture, an Ar—$H_2$ gas mixture, AX gas, RX gas, ammonia cracked gas, or the like can be used as reducing gas.

According to the above-described manufacturing method of the copper bonded part (copper porous composite member 10), since the bonding material having the copper oxide or the mixture of the metallic copper and the copper oxide, in which the molar ratio between copper and oxygen is set to be in a range (Cu:O) of 1:0.3 to 1.0, is disposed in the bonding interface between the copper plate 11 and the copper porous body 20 in the bonding material disposing step S01, and the assembled body is heated and held in a reducing atmosphere in a range of 600° C. or higher and 1,050° C. or lower in the reduction sintering step S02, sintering is accelerated due to the hole diffusion of copper (I) oxide included in the copper oxide under predetermined conditions, additionally, the copper oxide is reduced, nascent surfaces made of the metallic copper which do not have any surface oxidation coats are generated, and it becomes possible to accelerate sintering due to surface diffusion caused by the contact between the nascent surfaces.

Therefore, it is possible to form the bonding layer 13 made of the metallic copper between the copper plate 11 and the copper porous body 20. The bonding layer 13 formed as described above does not include any additive elements other than copper and has a high purity, and thus the original electrical conductivity, high thermal conductivity, and high melting point of metallic copper are maintained. Therefore, the thermal resistance, the electrical conductivity, and the thermal conductivity of the bonding layer 13 are superior compared with those in a case in which a low-melting-point bonding material such as a brazing material is used.

Furthermore, as described above, sintering sufficiently proceeds due to the hole diffusion and the surface diffusion between the nascent surfaces, and thus it is possible to sufficiently improve the bonding strength.

In addition, in the present embodiment, since the average particle diameter D of the copper oxide powder or the metallic copper powder is set to be in a range of 0.05× Dp≤D≤2×Dp with respect to the average pore diameter Dp of the copper porous body 20, and, in the present embodiment, is set to be in a range of 1.5 μm or more and 400 μm or less, it is possible to suppress the copper oxide powder or the metallic copper powder entering the inside of the copper porous body 20, and it is possible to sufficiently ensure the contact areas between the bonding material and members are bonded, and thus it is possible to strongly bond together the copper plate 11 and the copper porous body 20 by reliably forming the bonding layer 13 made of metallic copper.

Furthermore, in the present embodiment, since the binder is applied to the bonding surface, and the copper oxide powder or the powder mixture of the metallic copper powder and the copper oxide powder is scattered, it is possible to reliably dispose the bonding material having the copper oxide or the mixture of metallic copper and the copper oxide, in which the molar ratio between copper and oxygen is set to be in a range (Cu:O) of 1:0.3 to 1.0, in the bonding interface between the copper plate 11 and the copper porous body 20. In addition, it is possible to suppress the copper oxide powder or the powder mixture of metallic copper powder and the copper oxide powder being dropped while being handled.

In addition, since the applied binder is decomposed and evaporated at a temperature that is below the temperature range specified for the reduction sintering step S02, the sintering process in the reduction sintering step S02 is not impaired, and the bonding layer 13 having an excellent bonding strength can be obtained.

Hitherto, the embodiments of the present invention have been described, however the present invention is not limited thereto, and the present invention can be appropriately modified within the scope of the technical ideas of the present invention.

For example, in the present embodiment, the assembled body in which the copper porous body and the copper plate which are made of tough pitch copper (JIS C1100) are bonded together has been described, however the present invention is not limited thereto, and, regarding the material of the copper member, the copper member may be constituted of a variety of copper or a copper alloy such as oxygen-free copper, phosphorus deoxidized copper, brass, chromium copper, or zirconium copper.

In addition, in the present embodiment, the copper porous composite member having the constitution shown in FIG. 1 has been described as an example, however, the present invention is not limited thereto, and the copper bonded part may be copper porous bodies bonded to both sides of a copper plate.

Furthermore, in the present embodiment, the copper porous body obtained by sintering copper fibers has been described as an example of the copper porous body, however, the present invention is not limited thereto, and the copper porous body may be a copper porous body made of a sintered body of copper powder, a copper non-woven fabric, or foamed copper.

EXAMPLES

Hereinafter, the results of a confirmation experiment that has been carried out in order to confirm the effects of the present invention will be described.

As copper members to be bonded, a copper plate and a copper porous body which were made of tough pitch copper (JIS C1100) were prepared.

The copper plate was provided with a rectangular plate shape having a length of 100 mm, a width of 25 mm, and a thickness of 3 mm.

For the copper porous body, a variety of copper short fibers having a diameter of 0.05 to 0.3 mm and a length of 2 to 4 mm were used, and fiber bundles having a length of 100 mm, a width of 25 mm, and a thickness of 3 mm were formed and sintered at 1,000° C. for 30 minutes in a reducing atmosphere, thereby producing a plurality of samples having different average pore diameters.

In addition, as the average pore diameter Dp of the copper porous body, a value defined by the following expression from the total pore specific surface area A and the total pore volume V measured using a mercury penetration was used.

$$Dp = 4V/A$$

In the present example, the measurement was carried out using a mercury porosimeter (trade name: AUTOPORE IV9500) manufactured by Shimadzu Corporation, however, the average pore diameter may also be computed using the above-described value obtained from measurement in which a gas adsorption method or the analysis results of three-dimensional images were appropriately used depending on the average pore diameter of the copper porous body.

Figure 4A:
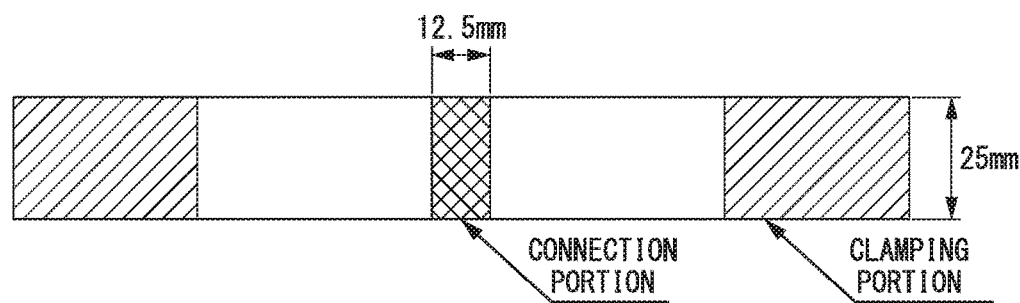
FIGS. 4A and 4B are explanatory views of a test specimen in an example.
Figure 4B:
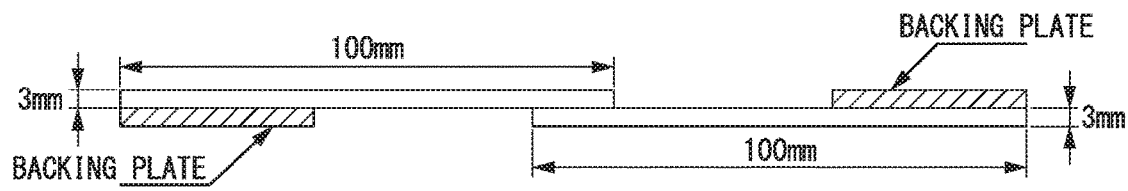

In the combination of members to be bonded shown in FIG. 1, the members to be bonded were superimposed together as shown in FIGS. 4A and 4B, the bonding material containing the copper oxide or the mixture of the metallic copper and the copper oxide shown in FIG. 1 was disposed in a range having a length of 12.5 mm as a connection portion, and, in this state, a reduction sintering step was carried out under the condition shown in Table 1.

The compositional ratios (molar ratios) between copper and oxygen in the bonding materials shown in Table 1 were obtained from amount determination results obtained by measuring the amount of copper using an atomic absorption method and determining the amount of oxygen using an inert gas dissolution-infrared adsorption method.

The average particle diameter of metallic copper powder or copper oxide powder included in the bonding material was defined as the 50% particle diameter (median diameter) measured using a laser diffraction and scattering-type particle size distribution measurement instrument (trade name: MT3300EX II) manufactured by MicrotracBEL Corporation.

For the obtained bonded bodies, the shear tensile strengths were measured using a tensile tester. The above-described bonding strength was evaluated according to JIS K6850 "Determination of tensile lap-shear strength of adhesives". The evaluation results are shown in Table 1.

In addition, for the obtained bonded bodies, the electrical resistance values of the bonding portions were measured. The electrical resistance value was obtained by measuring the electrical resistance values at places 5 mm away from both ends of the superimposed portion using a four-terminal measurement method. The measurement results are shown in Table 1.

TABLE 1

| | | Bonding conditions | | | | | | Measurement results | |
|---|---|---|---|---|---|---|---|---|---|
| | | Compositional ratio of bonding material | | Average particle diameter | Members to be bonded | | Average pore diameter of porous body | Sintering temperature in reducing atmosphere | Shear tensile strength | Electrical resistance of bonding portion |
| | | Cu | O | μm | Member 1 | Member 2 | μm | (° C.) | (N) | (m · Ω) |
| Invention Example | 1 | 1 | 1.00 | 60 | Plate | Porous body | 100 | 1,050 | 53 | 0.32 |
| | 2 | 1 | 0.30 | 5 | Plate | Porous body | 100 | 910 | 48 | 0.26 |
| | 3 | 1 | 0.80 | 100 | Plate | Porous body | 50 | 1,010 | 45 | 0.29 |
| | 4 | 1 | 0.90 | 10 | Plate | Porous body | 50 | 780 | 33 | 0.42 |
| | 5 | 1 | 0.75 | 100 | Plate | Porous body | 200 | 900 | 49 | 0.32 |
| | 6 | 1 | 0.85 | 10 | Plate | Porous body | 200 | 600 | 41 | 0.26 |
| | 7 | 1 | 0.35 | 1.5 | Plate | Porous body | 30 | 610 | 24 | 0.41 |
| | 8 | 1 | 0.40 | 60 | Porous body | Porous body | 30 | 720 | 31 | 0.62 |
| | 9 | 1 | 0.55 | 200 | Porous body | Porous body | 100 | 630 | 26 | 0.65 |
| | 10 | 1 | 0.75 | 60 | Porous body | Porous body | 100 | 1,030 | 62 | 0.55 |
| | 11 | 1 | 0.65 | 5 | Porous body | Porous body | 50 | 620 | 42 | 0.42 |
| | 12 | 1 | 0.80 | 400 | Porous body | Porous body | 200 | 720 | 34 | 0.47 |
| | 13 | 1 | 0.90 | 60 | Porous body | Porous body | 30 | 880 | 41 | 0.41 |
| Comparative Example | 1 | 1 | 0.00 | 5 | Plate | Porous body | 100 | 880 | Not bonded | |
| | 2 | 1 | 0.25 | 100 | Plate | Porous body | 100 | 890 | 17 | 0.62 |
| | 3 | 1 | 0.15 | 60 | Porous body | Porous body | 100 | 1,030 | 13 | 0.81 |
| | 4 | 1 | 0.65 | 1 | Plate | Porous body | 100 | 620 | 16 | 0.50 |
| | 5 | 1 | 0.80 | 300 | Porous body | Porous body | 100 | 700 | Not bonded | |
| | 6 | 1 | 0.50 | 60 | Plate | Porous body | 100 | 570 | 18 | 0.57 |
| | 7 | 1 | 0.60 | 10 | Plate | Porous body | 100 | 1,070 | Part of members to be bonded are melted | |

In Comparative Example 1 in which the ratio of oxygen in the molar ratio between copper and oxygen in the bonding material was zero, that is, no copper oxide was included, it was not possible to bond together the copper members.

In Comparative Example 2 and Comparative Example 3 in which the ratio of oxygen in the molar ratio between copper and oxygen in the bonding material was below the range of the present invention, the shear tensile strength was low, and the bonding strength was not sufficient. In addition, the electrical resistance of the bonding portion also became relatively great.

In Comparative Example 4 in which the average particle diameter of the metallic copper powder or the copper oxide powder included in the bonding material was below the range of the present invention, the shear tensile strength was low, and the bonding strength was not sufficient.

In Comparative Example 5 in which the average particle diameter of the metallic copper powder or the copper oxide powder included in the bonding material was above the range of the present invention, it was not possible to bond together the copper members.

In Comparative Example 6 in which the sintering temperature in the reduction sintering step was below the range of the present invention, the shear tensile strength was low, and the bonding strength was not sufficient.

In Comparative Example 7 in which the sintering temperature in the reduction sintering step was above the range of the present invention, a part of the members to be bonded was melted.

In contrast, in the invention examples in which the molar ratio between copper and oxygen in the bonding material, the average particle diameter of the metallic copper powder or the copper oxide powder included in the bonding material, and the sintering temperature in the reduction atmosphere were set in the ranges of the present invention, the shear tensile strengths were high, and the bonding strengths were sufficient. In addition, the electrical resistances of the bonding portions also became relatively small.

Based on what has been described above, it was confirmed that, according to the present invention, it is possible to manufacture a copper bonded part having a high bonding strength and having a bonding layer being excellent in terms of electrical conductivity, thermal conductivity, and thermal resistance.

INDUSTRIAL APPLICABILITY

According to the present invention, it is possible to manufacture a copper bonded part having a high bonding strength and having a bonding layer being excellent in terms of electrical conductivity, thermal conductivity, and thermal resistance, and thus the present invention is industrially applicable.

REFERENCE SIGNS LIST

10 COPPER POROUS COMPOSITE MEMBER (COPPER BONDED PART)
11 COPPER PLATE (FIRST COPPER MEMBER)
13 BONDING LAYER
20 COPPER POROUS BODY (SECOND COPPER MEMBER)
21 COPPER FIBER
22 SKELETON
S01 BONDING MATERIAL DISPOSING STEP
S02 REDUCTION SINTERING STEP

What is claimed is:

1. A manufacturing method of a copper bonded part in which a first copper member and a second copper member are bonded together,
the first copper member and the second copper member being made of copper or a copper alloy,
the second copper member including a copper porous body made of copper or a copper alloy,
the manufacturing method comprising:
a bonding material disposing step of disposing a bonding material between the first copper member and the second copper member; and
a reduction sintering step of heating and holding the first copper member, the second copper member, and the bonding material in a reducing atmosphere in a range of 600° C. or higher and 1,050° C. or lower,
wherein the bonding material contains a copper oxide or a mixture of metallic copper and the copper oxide in which a molar ratio between copper and oxygen is set to be in a range (Cu:O) of 1:0.3 to 1.0, and has at least one of copper oxide powder or metallic copper powder,
an average particle diameter D of the copper oxide powder or the metallic copper powder in the bonding material is in a range of $0.05 \times Dp \leq D \leq 2 \times Dp$ with respect to an average pore diameter Dp of the copper porous body of the second copper member, and
a bonding layer made of metallic copper is formed between the first copper member and the second copper member.

2. The manufacturing method of a copper bonded part according to claim 1,
wherein, in the bonding material disposing step, an amount of the copper oxide powder or a powder mixture of the metallic copper powder and the copper oxide powder disposed per unit area in a bonding surface between the first copper member and the second copper member is set to 0.02 g/cm² or more and 0.5 g/cm² or less.

3. The manufacturing method of a copper bonded part according to claim 1,
wherein the first copper member is a copper plate made of copper or a copper alloy.

4. The manufacturing method of a copper bonded part according to claim 1,
wherein the first copper member includes a copper porous body made of copper or a copper alloy.

5. The manufacturing method of a copper bonded part according to claim 1,
wherein the copper porous body has an apparent density DA that is 51% or less of a true density DT of the copper fiber.

6. The manufacturing method of a copper bonded part according to claim 5,
wherein, in the bonding material disposing step, an amount of the copper oxide powder or a powder mixture of the metallic copper powder and the copper oxide powder disposed per unit area in a bonding surface between the first copper member and the second copper member is set to 0.02 g/cm² or more and 0.5 g/cm² or less.

7. The manufacturing method of a copper bonded part according to claim 1,
wherein the copper porous body has a skeleton in which a plurality of copper fibers is entangled and sintered together, the copper fiber has a diameter R in terms of an equivalent circle diameter of 0.02 mm or more and 1.0 mm or less, and a ratio L/R of a length L to the diameter R of the copper fiber is in a range of 4 or more and 2,500 or less.

8. The manufacturing method of a copper bonded part according to claim 7, wherein the copper porous body has an apparent density DA that is 51% or less of a true density DT of the copper fiber.

9. The manufacturing method of a copper bonded part according to claim 7,
wherein, in the bonding material disposing step, an amount of the copper oxide powder or a powder mixture of the metallic copper powder and the copper oxide powder disposed per unit area in a bonding surface between the first copper member and the second copper member is set to 0.02 g/cm$^2$ or more and 0.5 g/cm$^2$ or less.

10. The manufacturing method of a copper bonded part according to claim 1,
wherein the copper porous body has a specific surface area of 0.01 m$^2$/g or more and a porosity of 50% or more and 95% or less.

11. The manufacturing method of a copper bonded part according to claim 10,
wherein the copper porous body has a skeleton in which a plurality of copper fibers is entangled and sintered together, the copper fiber has a diameter R in terms of an equivalent circle diameter of 0.02 mm or more and 1.0 mm or less, and a ratio L/R of a length L to the diameter R of the copper fiber is in a range of 4 or more and 2,500 or less.

12. The manufacturing method of a copper bonded part according to claim 10,
wherein the copper porous body has an apparent density DA that is 51% or less of a true density DT of the copper fiber.

13. The manufacturing method of a copper bonded part according to claim 10,
wherein, in the bonding material disposing step, an amount of the copper oxide powder or a powder mixture of the metallic copper powder and the copper oxide powder disposed per unit area in a bonding surface between the first copper member and the second copper member is set to 0.02 g/cm$^2$ or more and 0.5 g/cm$^2$ or less.

14. The manufacturing method of a copper bonded part according to claim 1,
wherein the bonding material includes copper (I) oxide.

15. The manufacturing method of a copper bonded part according to claim 14,
wherein, in the bonding material disposing step, an amount of the copper oxide powder or a powder mixture of the metallic copper powder and the copper oxide powder disposed per unit area in a bonding surface between the first copper member and the second copper member is set to 0.02 g/cm$^2$ or more and 0.5 g/cm$^2$ or less.

16. The manufacturing method of a copper bonded part according to claim 14,
wherein the copper porous body has an apparent density DA that is 51% or less of a true density DT of the copper fiber.

17. The manufacturing method of a copper bonded part according to claim 14,
wherein the copper porous body has a skeleton in which a plurality of copper fibers is entangled and sintered together, the copper fiber has a diameter R in terms of an equivalent circle diameter of 0.02 mm or more and 1.0 mm or less, and a ratio L/R of a length L to the diameter R of the copper fiber is in a range of 4 or more and 2,500 or less.

18. The manufacturing method of a copper bonded part according to claim 17,
wherein the copper porous body has an apparent density DA that is 51% or less of a true density DT of the copper fiber.

19. The manufacturing method of a copper bonded part according to claim 14,
wherein the copper porous body has a specific surface area of 0.01 m$^2$/g or more and a porosity of 50% or more and 95% or less.

20. The manufacturing method of a copper bonded part according to claim 19,
wherein the copper porous body has a skeleton in which a plurality of copper fibers is entangled and sintered together, the copper fiber has a diameter R in terms of an equivalent circle diameter of 0.02 mm or more and 1.0 mm or less, and a ratio L/R of a length L to the diameter R of the copper fiber is in a range of 4 or more and 2,500 or less.

21. The manufacturing method of a copper bonded part according to claim 19,
wherein the copper porous body has an apparent density DA that is 51% or less of a true density DT of the copper fiber.

22. The manufacturing method of a copper bonded part according to claim 19,
wherein, in the bonding material disposing step, an amount of the copper oxide powder or a powder mixture of the metallic copper powder and the copper oxide powder disposed per unit area in a bonding surface between the first copper member and the second copper member is set to 0.02 g/cm$^2$ or more and 0.5 g/cm$^2$ or less.

* * * * *